United States Patent
Lin et al.

(10) Patent No.: US 7,865,193 B2
(45) Date of Patent: Jan. 4, 2011

(54) COMMUNICATION APPARATUS CAPABLE OF PERFORMING A LOAD BALANCING AND METHOD THEREOF

(75) Inventors: Chin-Yi Lin, Yun-Lin Hsien (TW); Jia-Bin Huang, Taipei (TW)

(73) Assignee: Realtek Semiconductor Corp., Hsinchu (TW)

( * ) Notice: Subject to any disclaimer, the term of this patent is extended or adjusted under 35 U.S.C. 154(b) by 410 days.

(21) Appl. No.: 11/164,396

(22) Filed: Nov. 21, 2005

(65) Prior Publication Data

US 2006/0198348 A1    Sep. 7, 2006

(30) Foreign Application Priority Data

Nov. 22, 2004   (TW) ............................... 93135880 A

(51) Int. Cl.
*H04W 72/00*  (2009.01)
*H04W 4/00*   (2009.01)
*H04L 12/28*  (2006.01)
*H04L 9/00*   (2006.01)

(52) U.S. Cl. .................. 455/453; 370/338; 370/235; 370/395.21; 370/332; 380/277

(58) Field of Classification Search .................. 370/338, 370/235, 395.21, 332; 380/277; 455/453
See application file for complete search history.

(56) References Cited

U.S. PATENT DOCUMENTS

| | | | | |
|---|---|---|---|---|
| 5,822,696 | A * | 10/1998 | Bergkvist | 455/436 |
| 6,445,924 | B1 * | 9/2002 | Rasanen | 455/437 |
| 6,674,738 | B1 * | 1/2004 | Yildiz et al. | 370/338 |
| 7,299,019 | B1 * | 11/2007 | Austin et al. | 455/161.3 |
| 2003/0206535 | A1 * | 11/2003 | Shpak | 370/328 |
| 2004/0001467 | A1 | 1/2004 | Cromer et al. | |
| 2004/0063455 | A1 * | 4/2004 | Eran et al. | 455/525 |
| 2004/0106430 | A1 | 6/2004 | Schwarz et al. | |
| 2004/0162037 | A1 * | 8/2004 | Shpak | 455/101 |
| 2004/0240412 | A1 * | 12/2004 | Winget | 370/331 |
| 2005/0135305 | A1 * | 6/2005 | Wentink | 370/329 |
| 2005/0220054 | A1 * | 10/2005 | Meier et al. | 370/331 |

* cited by examiner

*Primary Examiner*—Vincent P Harper
*Assistant Examiner*—Ariel Balaoing

(57) ABSTRACT

A load balancing method applied in a communication apparatus is disclosed. The method includes assigning an identification code to a first and a second wireless transceivers; establishing a first link between a first transceiver and a station through a first channel according to the identification code; and establishing a second link between a second transceiver and the station through a second channel according to the identification code; and replacing the first link by the second link when a load of the first wireless transceiver is greater than that of the second wireless transceiver.

15 Claims, 3 Drawing Sheets

COMMUNICATION APPARATUS CAPABLE OF PERFORMING A LOAD BALANCING AND METHOD THEREOF

BACKGROUND OF THE INVENTION

1. Field of the Invention

The present invention relates to a communication system, and more specifically, to a communication apparatus capable of performing a load balancing operation.

2. Description of the Prior Art

Wireless communication technologies are rapidly developing, and several wireless communication specifications such as IEEE802.11a, IEEE802.11b, and IEEE802.11g specifications have been improved accordingly. Hence, wireless network cards produced and promoted by the manufacturers can support several specifications.

For example, two of the five access points (AP) conform to the IEEE802.11a specification, another two access points conform to the IEEE802.11b/g specification, and the remaining access point conforms to the IEEE802.11b specification. When a wireless network card is capable of supporting the three above-mentioned specifications, a user can establish a connection to any one of the above-mentioned five access points according to his/her preference, or use an operating system of the user's terminal to automatically select an access point with a greatest power from the above-mentioned five access points to establish a connection. However, because of various factors, such as the users in a same building are not averagely distributed, or the power of each access point is not the same, the methods of selection of an access point may result in a situation in which all users in the building only utilize a few specific access points, causing the networks of these specific access points to be jammed while the remaining access points are idle.

In a same operation area, it is necessary for different access points to use different medium access control addresses (MAC addresses) and different channels in order to avoid conflicts. Hence, in general, when a station, such as a notebook, is going to establish a connection with a specific access point, the station firstly needs to send a probe request to the specific access point. After the specific access point sends a probe response back to the station, the station then sends an authentication request to the specific access point. Next, the access point sends an authentication response back to the station. If the authentication is successful, the station sends an association request to the specific access point. After the specific access point sends an association response back to the station, the station and the specific access point can officially receive and transmit data. To ensure the safety of the data, there are several kinds of keys generated during the authenticating process. The methods of generating the above-mentioned keys are all related to an identification code (basic service set identification, BSSID) of the access point.

The several above-mentioned access points can also be integrated into a same wireless communication apparatus, such as a hot spot (which is well known to those skilled in the art), which means a built-in bridge is utilized. The built-in bridge is for connecting several wireless communication interfaces using different specifications, allowing the wireless communication apparatus to provide several kinds of wireless communication interfaces in a same area, and enabling a user to choose one of the wireless communication interfaces. Each of the wireless communication interfaces needs to have a unique BSSID to represent the wireless communication interface itself.

When using a related art load balancing method to connect a specific station originally connected to an access point (or a wireless communication apparatus) with a greater load (corresponding to a BSSID) to an access point (or a wireless communication apparatus) with a lesser load (corresponding to another BSSID), it is necessary to repeat the above-mentioned many and complicated steps to complete execution of a procedure of establishing a connection corresponding to another BSSID. Furthermore, if it is necessary to utilize a higher security mechanism, establishing a connection takes much more time and therefore the performance of the wireless communication apparatus will be substantially affected.

SUMMARY OF THE INVENTION

One of the objectives of the claimed invention provides an apparatus and a method thereof to solve the above-mentioned problem.

One of the objectives of the claimed invention provides an apparatus and a method thereof to provide an identification code to several wireless transceivers.

One of the objectives of the claimed invention provides an apparatus and a method thereof to share the information that was utilized to establish the link, therefore omitting steps of establishing a new link, and authenticating and exchanging key(s).

According to the claimed invention, a load balancing method applied in a wireless communication apparatus is disclosed. The method comprises: assigning an identification code to a first and a second wireless transceivers; establishing a first link between the first wireless transceiver and a station through a first channel according to the identification code; establishing a second link between the second wireless transceiver and the station through a second channel according to the identification code when a load of the first wireless transceiver is greater than the load of the second wireless transceiver; wherein the first and the second channels are independent.

In addition, the claimed invention provides a wireless communication apparatus. The wireless communication apparatus comprises: a first wireless transceiver for establishing a first link between the first wireless transceiver and a station through a first channel according to an identification code; a second wireless transceiver for establishing a second link between the second wireless transceiver and the station through a second channel according to the identification code; and a controller, coupled to the first and the second wireless transceivers, for enabling the second link to replace the first link when a load of the first wireless transceiver is greater than a load of the second wireless transceiver.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
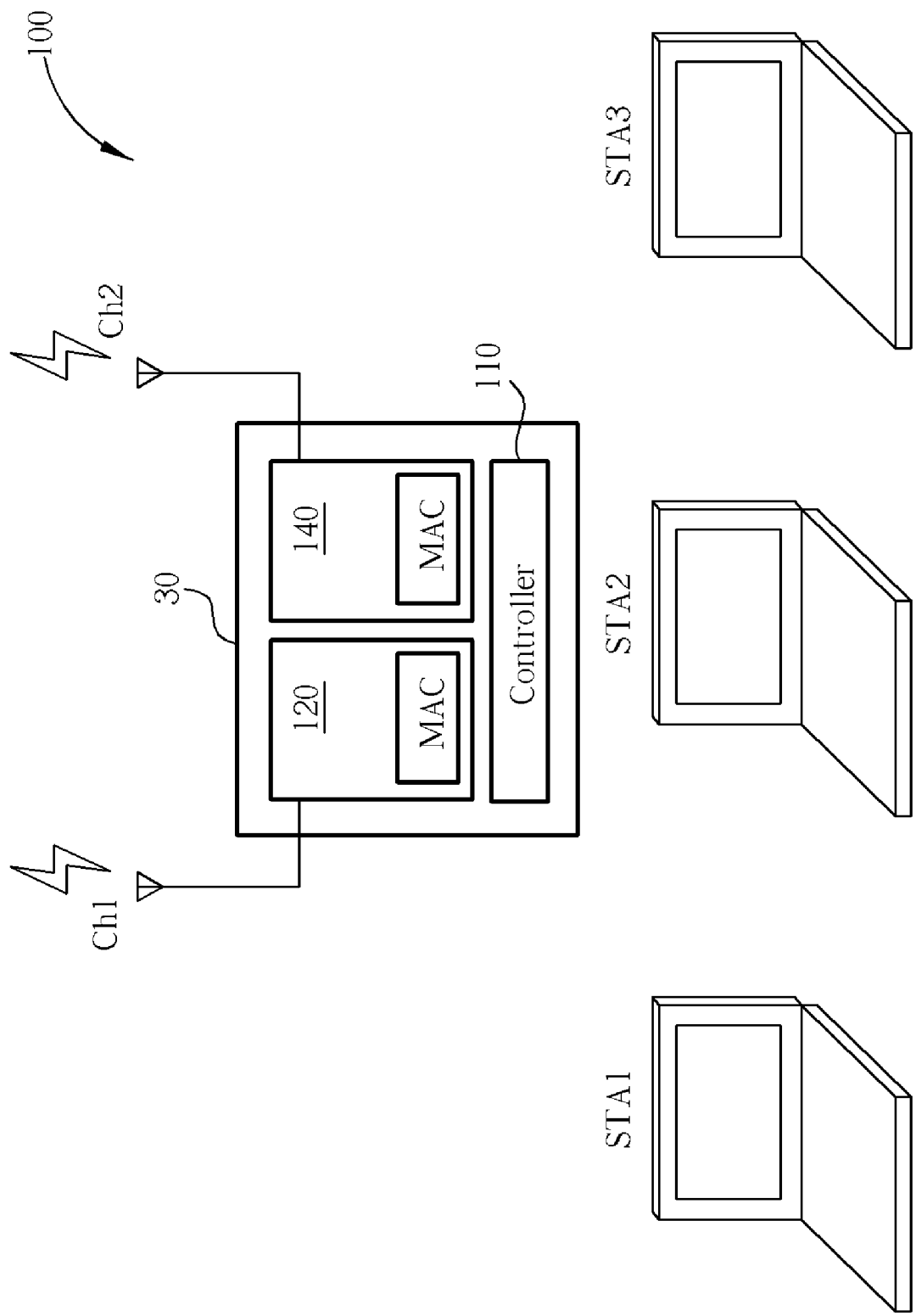
FIG. 1 is a diagram of an apparatus according to an embodiment of the present invention.

FIG. 1 is a diagram of a wireless communication apparatus 100 according to an embodiment of the present invention. The wireless communication apparatus 100 is an access point and comprises a controller 110 and a plurality of wireless transceivers 120 and 140. The wireless transceivers 120 and 140 work on two independent channels ch1 and ch2 respectively, and use a same BSSID (a same MAC address) to establish a link and proceed to communicate. The wireless transceiver 120 is connected with a station STA1, and the wireless transceiver 140 is connected with a station STA2. The wireless transceivers 120 and 140 cab be use different wireless communication specifications (IEEE802.11a and IEEE802.11b/g respectively) and different bands (5 GHz and 2.4 GHz respectively). The wireless transceivers 120 and 140 also can use a same/different wireless communication specification and a same band as long as the channels ch1 and ch2 are independent. The channels ch1 and ch2, utilized by the wireless transceivers 120 and 140 respectively, do not interfere with each other. Hence, when the station STA1 shown in FIG. 1 is going to transmit a package to the wireless transceiver 120, the package will not be incorrectly received by the wireless transceiver 140. Therefore, the data transmission between the station STA1 and the wireless transceiver 120 will not be affected by cross channel interference.

Figure 2:
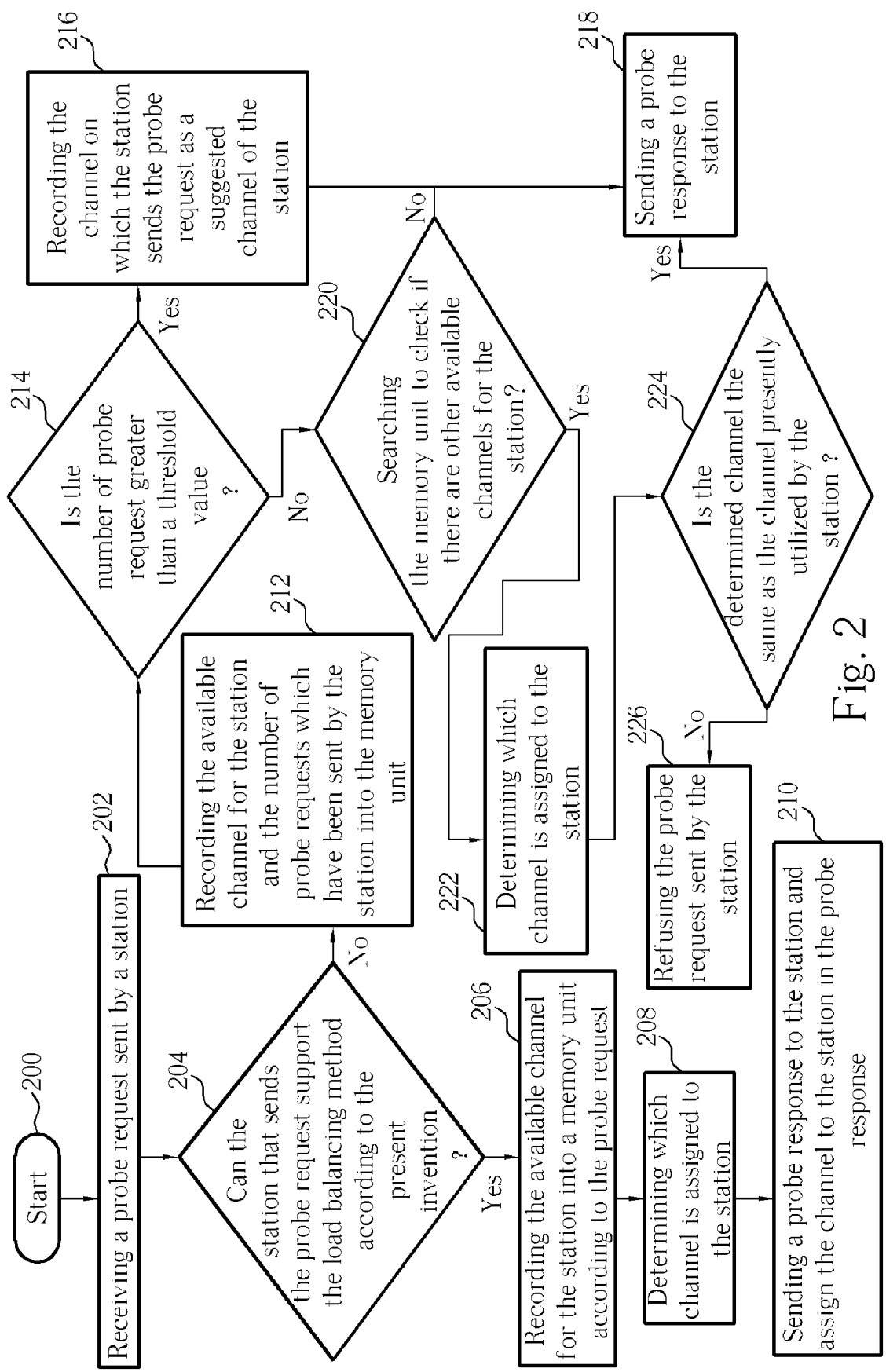
FIG. 2 is a flowchart describing the apparatus shown in FIG. 1 processing a probe request.

Please refer to FIG. 1 and FIG. 2. FIG. 2 is a flowchart describing the apparatus 100 shown in FIG. 1 processing a probe request.

Step 202: Receiving a probe request sent by a station.

Step 204: Determining whether the station that sends the probe request support the load balancing method according to the present invention. If yes, proceed to step 206; otherwise, proceed to step 212.

Step 206: Recording the available channel for the station into a memory unit according to the probe request.

Step 208: Determining which channel is assigned to the station.

Step 210: Sending a probe response to the station and assign the channel to the station in the probe response.

Step 212: Recording the available channel for the station and the number of probe requests which have been sent by the station into the memory unit.

Step 214: Is the number of probe request greater than a threshold value? If yes, proceed to step 216; otherwise, proceed to step 220.

Step 216: Recording the channel on which the station sends the probe request as a suggested channel of the station, and reset the value of number of probe request.

Step 218: Sending a probe response to the station.

Step 220: Searching the memory unit to check if there are other available channels for the station.

Step 222: Determining which channel is assigned to the station.

Step 224: Is the determined channel the same as the channel presently utilized by the station? If yes, proceed to step 218; otherwise, proceed to 226.

Step 226: Refusing the probe request sent by the station.

The station STA3 is assumed to be capable of supporting the load balancing method of the present invention. The station STA3 sends a probe request on a channel with 2.4 GHz to the wireless transceiver 140. At this time, the controller 110 in the apparatus 100 determines whether to establish a link (connection) between the station STA3 and the wireless transceiver 140 or between the station STA3 and the wireless transceiver 120 according to the loads of the wireless transceivers 120 and 140.

If the station STA3 cannot support the load balancing method of the present invention, the controller 110 records a channel utilized by the station STA3 and records the number of probe requests which have been sent by the station STA3 into the memory unit (Step 212). In the embodiment, if the number of probe requests which have been sent by the station STA3 is greater than a threshold value, this means that the station STA3 may be able to use only one channel with 2.4 GHz. Hence, the controller 110 sets the channel with 2.4 GHz to be the suggested channel of the station STA3 (Step 216) and sends a probe response back to the station STA3 (Step 218) in order to establish a connection (link) between the station STA3 and the wireless transceiver 140. If the number of probe requests which have been sent by the station STA3 is less than a threshold value, the controller 110 determines if there are other available channels for the station STA3 (Step 220). If there are no other available channels for the station STA3, a probe response is sent back to the station STA3 (Step 218). However, if there are other available channels for the station STA3, the controller 110 selects a channel from the available channels to be the suggested channel of the station STA3 (Step 222) and determines whether the selected channel in step 222 is the same as the current channel utilized for sending a response request by the station STA3 (Step 224). If the suggested channel is different from the current channel utilized for sending a response request by the station STA3, the controller 110 disables the connection to force the station STA3 to use one of the other channels to send probe requests (Step 226). If the suggested channel is the same as the current channel presently utilized for sending a response request by the station STA3, the controller 110 sends a probe response back to the station STA3 to let the station STA3 establish a connection (Step 218). When a plurality of wireless transceivers use a same wireless communication specification, the above-mentioned procedure can also be applied.

After the station STA3 receives the probe response, the follow-up steps of authenticating and exchanging keys are further performed between the station STA3 and the wireless transceiver to set a pairwise transient key (PTK) utilized by the station STA3 and the wireless transceiver and set a group transient key (GTK) utilized when broadcasting or multicasting. It should be noted that the wireless transceivers 120 and 140 use a same MAC address, so a PTK or a GTK generated by the station STA3 and a PTK or a GTK generated by either wireless transceiver will be identical.

Figure 3:
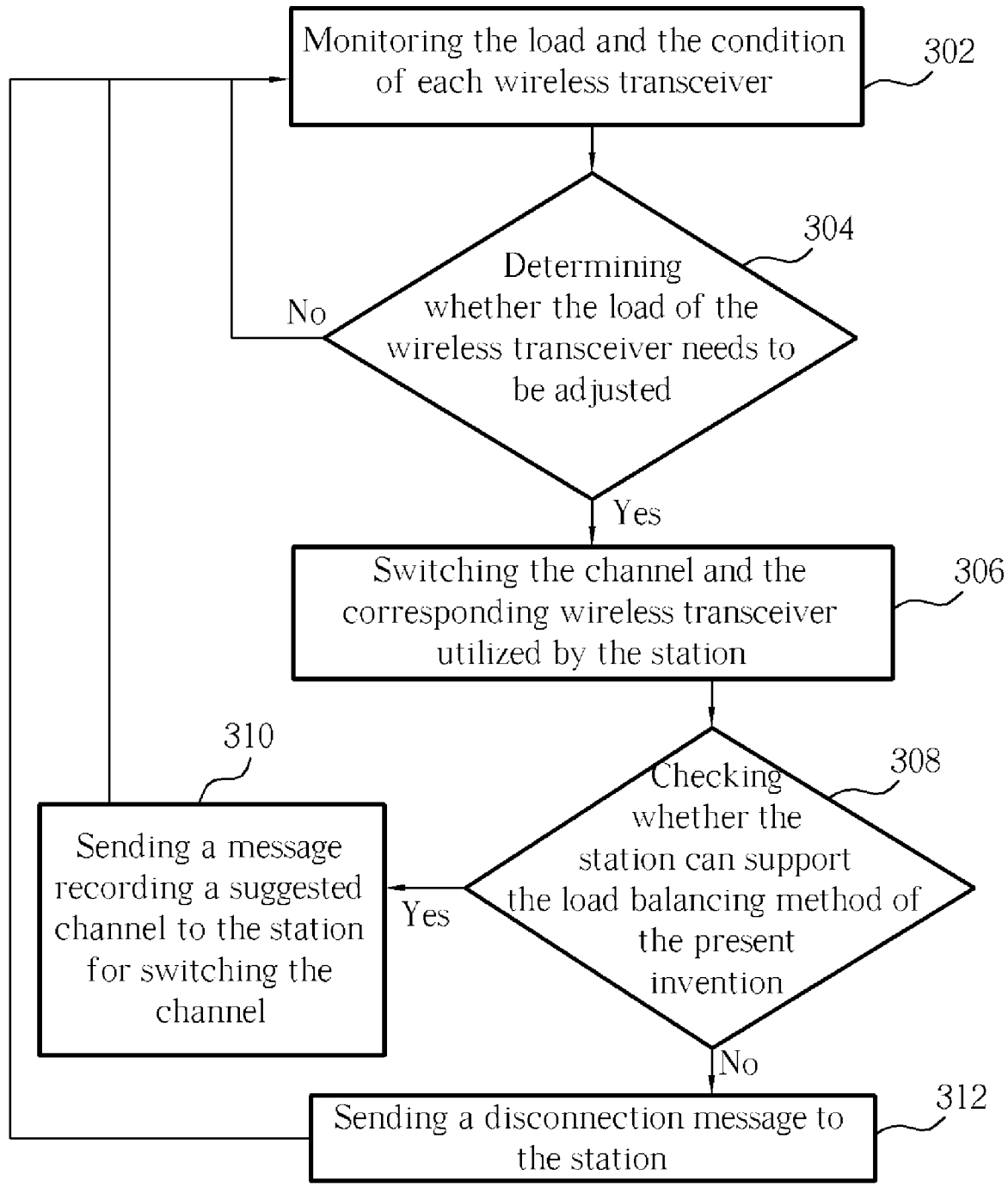
FIG. 3 is a flowchart describing the apparatus shown in FIG. 1 performing a load balancing.

Please refer to FIG. 1 and FIG. 3. FIG. 3 is a flowchart describing the apparatus 100 shown in FIG. 1 performing a load balancing operation. The load balancing operation performed by the apparatus 100 comprises the following steps:

Step 302: Monitoring the load and the condition of each wireless transceiver.

Step 304: Determining whether the load of the wireless transceiver needs to be adjusted. If yes, proceed to step 306; otherwise, go back to step 302.

Step 306: switching the channel and the corresponding wireless transceiver utilized by the station.

Step 308: Checking whether the station can support the load balancing method of the present invention. If yes, proceed to step 310; otherwise, proceed to step 312.

Step 310: Sending a message recording a suggested channel to the station for switching the channel, in order to directly establish a connection between the station and another wireless transceiver; therefore the procedure of establishing a connection will not need to be restarted.

Step 312: Sending a disconnection message to the station.

Therefore, the stations STA1 and STA3 are assumed to both keep connections with the wireless transceiver 120, and the station STA2 keeps a connection with the wireless transceiver 140. When the amount of data transmitted by the station STA1 is suddenly and rapidly increased, the load of the wireless transceiver 120 may exceed its capability. Hence, the controller 110 can send a message to the station STA3 by using the wireless transceiver 120 to command the station STA3 to switch to the channel also utilized by the wireless transceiver 140 and transmit the data to the wireless transceiver 140. It should be noted that, as mentioned above, the station STA3 and the wireless transceiver 140 can directly use the keys previously utilized by the station STA3 and the wireless transceiver 120 when the station STA3 was previously connected with the wireless transceiver 120, so the steps of authenticating and re-establishing a connection can be omitted. In addition, if the station STA3 does not support the load balancing method, the controller 110 then sends a disconnection message to the station STA3 by using the wireless transceiver 120 to reduce the load of the wireless transceiver 120.

The apparatus of the invention do not need to use software programs of higher levels (ex: application level), or independent hardware devices to perform a load balancing operation, but just need to perform a load balancing operation in a driver of the apparatus. Therefore, the load of a plurality of wireless transceivers can be adjusted dynamically. Additionally, the apparatus of the present invention assign a same MAC address to different wireless transceivers. In this way, the time of re-establishing a new connection, authenticating and exchanging keys can be saved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A load balancing method applied in a communication apparatus comprising a first wireless transceiver and a second wireless transceiver the method comprising:
   assigning an identification code to the first wireless transceiver, and assigning the same identification code assigned to the first wireless transceiver to the second wireless transceiver;
   establishing a first link between the first wireless transceiver and a station through a first channel according to the identification code; and
   controlling the first wireless transceiver to transmit a message to the station for commanding the station to switch from the first channel to another channel when a load of the first wireless transceiver is greater than a load of the second wireless transceiver;
   establishing a second link between the second wireless transceiver and the station through a second channel according to the message and the identification code to replace the first link;
   wherein the first and the second channels are substantially independent;
   wherein the first link is established by generating a configuration for ensuring data safety according to the identification code, and the configuration is directly utilized to establish the second link; and
   wherein the station sends at least a probe request located in a first frequency band to the first wireless transceiver, a frequency band of the first channel is determined according to a number of probe requests, and when the number is greater than a threshold, the frequency band of the first channel is determined as the first frequency band.

2. The method of claim 1, wherein the identification referd to a same media access control address (MAC address) used by the first and second wireless transceivers.

3. The method of claim 1, wherein the identification code is a basic service set identification (BSSID).

4. The method of claim 1, wherein the configuration comprises a pairwise transient key (PTK).

5. The method of claim 1, wherein the configuration comprises a group transient key (GTK).

6. An apparatus capable of performing a load balancing, comprising:
   a first wireless transceiver for establishing a first link between the first wireless transceiver and a station through a first channel according to an identification code;
   a second wireless transceiver for establishing a second link between the second wireless transceiver and the station through a second channel according to the same identification code utilized by the first wireless transceiver, wherein the first and the second channels are independent; and
   a controller, coupled to the first and the second wireless transceivers, for starting the second link to replace the first link and controlling the first wireless transceiver to transmit a message to the station for commanding the station to switch from the first channel to another channel when a load of the first wireless transceiver is greater than a load of the second wireless transceiver;
   wherein the second wireless transceiver replaces the first link by the second link according to the message and the same identification code utilized by the first wireless transceiver;
   wherein the first wireless transceiver and the station generate a configuration for ensuring data safety according to the identification code to establish the first link, and the second wireless transceiver and the station directly utilize the configuration to establish the second link;
   wherein the station sends at least a probe request located in a first frequency band to the first wireless transceiver, a frequency band of the first channel is determined according to a number of probe requests by the controller, and when the number is greater than a threshold, the frequency band of the first channel is determined as the first frequency band by the controller.

7. The apparatus of claim 6, wherein the identification code refers to a same media access control address (MAC address) used by the first and second wireless transceivers.

8. The apparatus of claim 6, wherein the identification code is a basic service set identification (BSSID).

9. The apparatus of claim 6, wherein the configuration comprises a pairwise transient key (PTK).

10. The apparatus of claim 6, wherein the configuration comprises a group transient key (GTK).

11. The apparatus of claim 6 being an access point (AP).

12. An apparatus capable of performing a load balancing, comprising:
    a first wireless transceiver for establishing a first link between the first wireless transceiver and a station through a first channel according to an identification code and generating a configuration for ensuring data safety; and
    a second wireless transceiver for establishing a second link between the second wireless transceiver and the station through a second channel according to the same identification code utilized by the first wireless transceiver and the configuration;

a controller, coupled to the first and the second wireless transceivers, for determining to establish the first link or the second link, the controller being arranged to control the first wireless transceiver to transmit a message to the station for commanding the station to switch from the first channel to another channel when a load of the first wireless transceiver is greater than a load of the second wireless transceiver;

wherein the first and the second channels are independent, and the second wireless transceiver replaces the first link by the second link according to the message and the same identification code utilized by the first wireless transceiver;

the first link is established by generating the configuration according to the identification code, and the configuration is directly utilized to establish the second link; and wherein the station sends at least a probe request located in a first frequency band to the first wireless transceiver, a frequency band of the first channel is determined according to a number of probe requests by the controller, and when the number is greater than a threshold, the frequency band of the first channel is determined as the first frequency band by the controller.

13. The apparatus of claim 12, wherein the configuration comprises a pairwise transient key (PTK).

14. The apparatus of claim 12, wherein the configuration comprises a group transient key (GTK).

15. A load balancing method applied in a communication apparatus comprising a first wireless transceiver and a second wireless transceiver; the method comprising:

assigning a media access control address (MAC address) to the first wireless transceiver, and assigning the same MAC address which is assigned to the first wireless transceiver to the second wireless transceiver;

establishing a first link between the first wireless transceiver and a station through a first channel by referring to the same media access control address (MAC address) used by the first and second wireless transceivers; and establishing a second link between the second wireless transceiver and the station through a second channel according to the MAC address to replace the first link without restarting a procedure of establishing a connection when a load of the first wireless transceiver is greater than a load of the second wireless transceiver;

wherein the first and the second channels are substantially independent;

wherein the first link is established by generating a configuration for ensuring data safety according to the identification code, and the configuration is directly utilized to establish the second link; and wherein the station sends at least a probe request located in a first frequency band to the first wireless transceiver, a frequency band of the first channel is determined according to a number of probe requests, and when the number is greater than a threshold, the frequency band of the first channel is determined as the first frequency band.

* * * * *